Aug. 18, 1936.  C. T. KAUTTER  2,051,486
PRODUCTION OF MONOALKYLOLAMINES
Filed Oct. 1, 1934
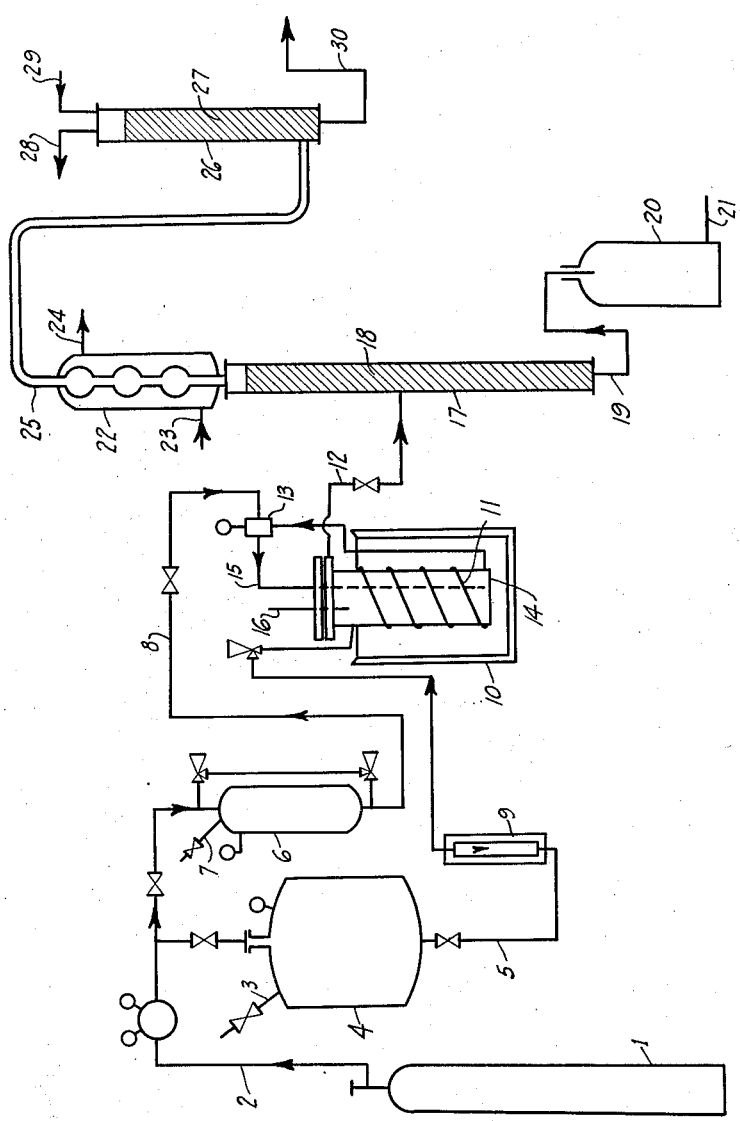
Inventor: Carl T. Kautter
By his Attorney: Arthur B Bakala Patented Aug. 18, 1936

2,051,486

UNITED STATES PATENT OFFICE 2,051,486

PRODUCTION OF MONOALKYLOLAMINES

Carl T. Kautter, Berkeley, Calif., assignor to Shell Development Company, San Francisco, Calif., a corporation of Delaware Application October 1, 1934, Serial No. 746,357

12 Claims. (Cl. 260—127)

This invention relates to a novel process for the production of monoalkylolamines which comprises reacting an alkylene oxide with a molal excess of ammonia, preferably in the presence of water with the reactants and water present in such proportions that the alkylene oxide reacts with the ammonia to the extent that the resulting reaction product consists of substantially only monoalkylolamine or consists of a mixture of alkylolamines materially predominating in monoalkylolamine.

The monoalkylolamines are in general lower boiling and more basic than the di- and trialkylolamines. These properties in addition to others render the monoalkylolamines or mixtures predominating in monoalkylolamine more suitable for a wide variety of purposes. In particular, the monoalkylolamines are more suitable as absorbent agents in gas purification processes and as extractants in mineral and vegetable oil refining processes due to their relatively greater ease of regeneration.

A study of the art to which my invention appertains reveals the fact that alkylolamines have been prepared by reacting alkylene oxides with ammonia. The results of the prior investigators indicate that regardless of the relative proportions of the reactants employed, the tendency of the reaction is to produce mixtures of alkylolamines predominating in or containing substantially only di- and/or trialkylolamines. The prior art reveals attempts to control the reaction so that monoalkylolamines could be obtained in practical yields. These attempts have failed to provide a practical, efficient and economical process applicable to the conversion of alkylene oxides to monoalkylolamines.

When the simplest alkylene oxide, namely ethylene oxide, is reacted with ammonia, the following reactions may occur resulting in the formation of mono-, di- and triethanolamines respectively.

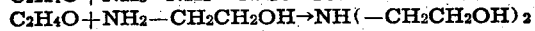
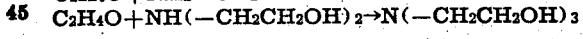

$C_2H_4O + NH_3 \rightarrow NH_2-CH_2CH_2OH$
$C_2H_4O + NH_2-CH_2CH_2OH \rightarrow NH(-CH_2CH_2OH)_2$
$C_2H_4O + NH(-CH_2CH_2OH)_2 \rightarrow N(-CH_2CH_2OH)_3$ It has been the opinion of prior investigators that the relative rates of the reactions involved are primarily dependent on the temperature of the reaction mixture. Accordingly, it has been their opinion that the reaction could be stopped at the monoethanolamine stage by conducting the process at temperatures prohibitive to the formation of the "di-" and "tri-" products. Processes based on this principle are executed at temperatures below 10° C.

Now, I have found that the principal factors in controlling the reaction to produce substantially only monoalkylolamines are the relative molal proportions of alkylene oxide to ammonia and alkylene oxide to water present in the reaction mixture. I prefer to execute my invention in the presence of water, due to the relatively slow rate of reaction under anhydrous conditions, at temperatures at which the reactants and reaction products are substantially stable. I have found that monoalkylolamines can be readily prepared by my method, the successful operation of which is relatively independent of the mode of contacting the reactants, and which is broadly applicable to the production of monoalkylolamines within a wide range of temperature and pressure conditions. I need not execute my invention at low temperatures, but may successfully execute the same at temperatures sufficiently high to insure substantially complete reaction at a practical rate. I employ much greater relative proportions of ammonia to alkylene oxide than have hitherto been contemplated and, further, I make use of the conjunctive influence of the molal ratio of the alkylene oxide to water present. The successful execution of my invention necessitates the presence of alkylene oxide and ammonia in the molal ratio of one mol of alkylene oxide to at least twenty mols of ammonia. Further, the economical execution of the same is dependent on the presence of alkylene oxide and water in the molal ratio of one mol of alkylene oxide to at least ten mols of water. I prefer to operate with the reactants present in the reaction mixture in the ratio of one mol of alkylene oxide to from twenty to fifty mols of ammonia in the presence of from ten to two hundred mols of water. For purposes of clearness and convenience, this preferred range of molal ratios, based on alkylene oxide as one, will hereinafter and in the appended claims be represented by the expression: 1:20-50:10-200.

Normally gaseous or liquid alkylene oxides are preferably employed in the execution of my invention; however, when desired, solid alkylene oxides may also be employed. I prefer to execute the same with members of that class of compounds known as alkylene oxides and of which ethylene oxide is the simplest member. For example, I contemplate the alkylene oxides such as ethylene oxide, propylene oxide, the normal- and iso-butylene oxides, the amylene oxides, the hexylene oxides and the like as well as their homologues, analogues and suitable substitution products. I may employ the alkylene oxides severally or in combination or I may in certain cases resort to the use of mixtures thereof with relatively unreactive substances. When mixtures of several species of alkylene oxides are reacted, the reaction product which will comprise a mixture of monoalkylolamines may be used as such or the mixture may be treated and the species of monoalkylolamines separated.

I may execute my invention by introducing an alkylene oxide, preferably in either the gaseous or liquid state, into an aqueous solution of ammonia, by introducing the alkylene oxide and gaseous ammonia into a body of water, or by simultaneously introducing the reactants, in any suitable state, and water into a suitable reaction vessel. When the solid alkylene oxides are employed, they may be dissolved or suspended in water or the aqueous ammonia solution, or the solid oxide may be dissolved in a suitable inert solvent prior to contact with the aqueous ammonia solution. In general, I prefer to employ aqueous ammonia solutions having concentrations of from 15% to 70% ammonia. The concentration of the aqueous ammonia solution is so chosen that the alkylene oxide, ammonia and water are present in the reaction mixture in the molal ratio of about 1:20–50:10–200. It will be obvious that the concentration of the ammonia solution employed will be dependent on the specific molal ratio resorted to, on the temperature and pressure at which it is desirous to effect the reaction, and on the cost and practicability of dehydrating the resulting monoalkylolamine solution. For example, I may react ethylene oxide with a 70% aqueous solution with the reactants and water present in the ratio 1:25:10. At 100° C., the reaction is conducted at an approximate gauge pressure of 630 pounds per square inch with the attainment of a 71% yield of monoethanolamine. Employing a 50% ammonia solution and a ratio of 1:25:25, the pressure at 100° C. is about 315 pounds per square inch, and a yield of 75% monoethanolamine is obtained. At 100° C. employing an 18% ammonia solution and a ratio of about 1:25:109, the pressure is only 40 pounds per square inch, and a yield of 81% monoethanolamine is obtained. These results show that, other conditions being the same, there is an increase in yield and a decrease in pressure in the system as the concentration of the ammonia solution is decreased from 70% $NH_3$ to 18% $NH_3$. Accordingly, at 100° C. it has been found preferable, in a batch or intermittent mode of operation to employ ammonia solutions having concentrations of from 18% to 30%, with the reactants and ammonia present in the ratio of 1:25–45:30–200. In general, at elevated temperatures, the use of about 20% aqueous ammonia solutions is advantageous in that the gaseous or liquid alkylene oxide can be initially dissolved in the ammonia solution at about room temperature without resorting to cooling of the solution or compression of the reaction mixture or the introduced reactants. The temperature of the reaction mixture may be raised to the desired reaction temperature after the required quantity of alkylene oxide has been added thereto. After a reaction time sufficient to insure substantially complete reaction at the desired reaction temperature, the excess ammonia may be driven off and the major bulk of the water evaporated or removed by other suitable means from the mixture. The remainder of the water may be removed by any suitable means as by extraction or distillation. When distillation methods of dehydration are resorted to, the monoalkylolamine may be obtained in anhydrous form from the same still, the di- and trialkylolamines as well as poly-compounds of these bases remaining in the still as bottoms. While the use of higher concentrations of ammonia, such as 50% would obviously decrease the amount of water to be removed from the reaction product, the higher concentrations involve, on the other hand, lower yields and necessitate compression of both the ammonia solution and the alkylene oxide, and the use of expensive pressure equipment.

I have found that my invention may be executed in a wide range of temperatures and pressures. The pressure is generally dependent on the temperature of execution of the invention and on the ratio of ammonia to water present in the reaction mixture. The temperature to be employed is usually chosen with respect to the molal ratio of alkylene oxide to ammonia to water so that the reaction may proceed substantially to completion to form the monoalkylolamine at an optimum practical rate. At temperatures in the range of from 20° C. to 45° C., I may employ an 18.3% ammonia solution and a molal ratio of ethylene oxide to ammonia to water equal to 1:31:130 and effect the reaction at atmospheric pressure to obtain a 79.3% yield of monoethanolamine, however, the reaction generally requires about 16 hours to avoid excessive losses due to unreacted ethylene oxide. In the majority of cases, I prefer to execute my invention in a temperature range of from about 90° C. to 150° C. If about 20% ammonia solutions are employed in this temperature range, the reaction is usually effected at pressures of from about 30 to 250 pounds per square inch, and accordingly the use of high-pressure equipment is unnecessary. At temperatures of from about 90° C. to about 150° C., the reaction to form a reaction product materially predominating in monoalkylolamine proceeds rapidly to completion with the attainment of excellent yields.

My invention may be executed in any suitable apparatus. In executing the same, I may proceed as follows: an aqueous ammonia solution of the desired concentration is charged to a suitable reaction vessel which is capable of withstanding moderately elevated pressures and is preferably equipped with means for supplying the heat required to raise and maintain its contents at the desired reaction temperature. The reaction vessel is preferably in communication with a suitable supply tank from which the alkylene oxide may be introduced into the former at the desired rate. The alkylene oxide in either the gaseous or liquid state may be added to the aqueous ammonia solution in a batch, intermittent or continuous manner in sufficient amount to maintain the desired molal ratio of the reactants and water. The reaction mixture is heated to and maintained at the desired temperature until the reaction is substantially complete. The reaction vessel is preferably in communication with a suitable absorption stage into which the excess ammonia from the reaction vessel may be expanded and therein absorbed in a suitable solvent. Water may be used as a solvent and the resultant aqueous ammonia solution may be utilized in the same or another reaction vessel. The monoalkylolamine may be recovered from the aqueous reaction mixture in any suitable manner. Preferably the water is removed therefrom by distillation under atmospheric or subatmospheric pressure. If di- and/or trialkylolamines are present in an amount inhibitive to the use of the mixture, or if a pure monoalkylolamine is desired, the dehydrated mixture may be distilled at a suitable pressure and separation of the constituents effected.

I have observed that the reaction of an alkylene oxide with ammonia to form the corresponding monoalkylolamine appears to occur at a greater rate in the aqueous liquid phase than in the gaseous phase in the reaction vessel. This is particularly the case when alkylene oxides possessing more than two carbon atoms are reacted. My invention may be advantageously executed under conditions which will permit the existence of substantially only a liquid phase in the reaction vessel.

While I have described a method in which an alkylene oxide is added to an aqueous ammonia solution, it is to be understood that I may simultaneously introduce gaseous ammonia and the alkylene oxide into a body of water, or I may under suitable conditions simultaneously introduce alkylene oxide, gaseous ammonia and water into the reaction vessel. The alkylene oxide may be introduced per se or in solution or suspension in water or in an aqueous ammonia solution. The successful execution of my invention is not dependent on the mode of introduction of the reactants and/or water. It is only essential that, under the conditions of reaction, the reactants and water be present in a suitable molal ratio as herein specified.

My invention may be executed in a batch, intermittent or continuous manner. To illustrate specifically the execution of my invention in a continuous manner, the same will be described with reference to the accompanying drawing in which the single figure is a schematic representation, partly in section, and partly in elevation of a suitable apparatus.

In this figure a pressure tank 1 in which is contained an inert gas, such as nitrogen under pressure, is in communication by means of a conduit 2, with an aqueous ammonia storage vessel 4 and an alkylene oxide storage vessel 6 which is provided with inlet conduit 7. The aqueous ammonia storage vessel 6 is provided with an inlet conduit 3 and an outlet conduit 5. The pressure of the gas in pressure tank 1 forces the aqueous ammonia from 4 through the conduit 5 and through the rotameter or similar measuring device 9, then through the preheating coil 11, which surrounds the reaction vessel 14 and then into the mixing chamber 13 wherein admixture with alkylene oxide is effected. The alkylene oxide is forced, by means of the pressure applied thereon, in 6 through conduit 8 into the mixing chamber 13 wherein admixture with aqueous ammonia is effected. The mixture of alkylene oxide and aqueous ammonia is conducted by means of conduit 15 into the lower portion of the reaction vessel 14. The reaction vessel 14 is provided with a thermometer or other suitable temperature measuring device 16 and is immersed in a suitable heating bath 10. The upper portion of the reaction vessel 14 is in communication, by means of conduit 12, which contains therein a suitable expansion valve, with expansion column 17. By means of an expansion valve, the reaction product which is under pressure in the reaction vessel 14, passes through conduit 12 and is expanded into separating column 17. Column 17 is equipped with suitable contact elements 18. The lower portion of column 17 is in communication, by means of conduit 19, with a monoalkylolamine storage tank 20, provided with a suitable outlet conduit 21. The monoalkylolamine solution is separated from gaseous ammonia by fractionation in the column 17. The gaseous ammonia leaves the upper portion of column 17 and passes into condenser 22 wherein it is cooled and the liquefiable vapors condensed by the cooling action of a cooling medium passing into the cooling jacket of condenser 22 by conduit 23 and leaving by conduit 24. The cooled gaseous ammonia leaves the condenser and is conducted by means of conduit 25 to an ammonia absorption column 26 which is packed with suitable contact elements 27. In the absorption column 26, the gaseous ammonia is countercurrently contacted with a downwardly flowing stream of water entering through conduit 29. The absorption column 26 is vented to the atmosphere through conduit 28. The aqueous ammonia solution formed in column 26 is removed from the lower portion thereof through conduit 30.

Additional valves, flow-meters and temperature-measuring devices may be introduced at any suitable point or points in the cyclic system. If desired, the pressure tank 1 may be replaced by a suitable pump. Any suitable means of supplying heat to the reaction vessel 14 may be resorted to.

With reference to the figure, my invention may be executed in a continuous manner as follows:

The feed tank 4 is charged with a convenient quantity of aqueous ammonia solution of the desired concentration and the feed tank 6 is charged with a convenient quantity of alkylene oxide. Both feed tanks are then put under pressure and the reaction vessel 14 is filled with the aqueous ammonia solution and heated. When the desired reaction temperature is indicated by the thermometer 16, the aqueous ammonia solution is allowed to flow through the preheating coils 11, into the mixing chamber 13 and then into the reaction vessel 14. Simultaneously, the alkylene oxide is introduced into the stream of aqueous ammonia in the mixing chamber 13 at a predetermined rate. For example, 1 mol of alkylene oxide to 25 mols of ammonia. By adjusting the rates of flow of the alkylene oxide and ammonia solution, the reaction time can be varied within the practical limits of operation. The reaction liquid is continuously expanded through conduit 12 into the column 17 wherein the gaseous ammonia is separated from the aqueous monoalkylolamine solution by fractionation. The gaseous ammonia is countercurrently contacted with a predetermined quantity of water in the absorption column 26. The aqueous ammonia solution leaving 26 through conduit 30 may be conducted back to the feed tank 4 or reutilized in another apparatus. The aqueous monoalkylolamine solution discharged from the system by means of conduit 21 may be conducted to a suitable recovery stage wherein the monoalkylolamine may be recovered intermittently or continuously by any suitable means as by dehydration and fractionation.

To illustrate more clearly the mode and conditions of execution of my invention as applied to the production of specific monoalkylolamines, reference will be had to the following examples. It is, however, to be understood that my invention is not to be considered as limited to the specific operating modes and conditions therein described.

*Example I*

The reaction was effected in a suitable pressure reaction vessel having a capacity of about 6.2 liters and equipped with a thermometer, pressure gauge, expansion valve and an inlet tube by means of which the reactants could be introduced into the lower portion of said reaction vessel.

The reaction vessel was charged with about 6 liters of an aqueous ammonia solution having a concentration of about 170 gm. $NH_3$ per liter (18.31%). 88 gm. (2.0 mols) of ethylene oxide were added at a temperature of about 20° C. and the vessel was closed, immersed in a steam bath and heated at 94° C. for one hour. The maximum gauge pressure was 36 lbs./sq. in. At the end of this time the excess ammonia was expanded from the reaction vessel and absorbed in water. The reaction mixture was discharged from the reaction vessel and the monoalkylolamine was recovered therefrom by distillation.

The molal ratio of ethylene oxide: ammonia: water in the reaction mixture was 1:30:129.

The monoethanolamine was obtained in a yield of 83.2%.

*Example II*

5 liters of an aqueous ammonia solution having a concentration of 210 gm. of $NH_3$ per liter were charged to a pressure reaction vessel having a capacity of about 8.2 liters. About 172 gm. (2.36 mols) of isobutylene oxide were added to the aqueous ammonia solution at a temperature of about 22° C. The reaction vessel was closed and its contents were heated at a temperature of about 125° C. for 1 hour. The maximum gauge pressure in the reaction vessel was about 200 lbs./sq. in. After one hour of treatment the excess ammonia was expanded from the reaction vessel into a sufficient amount of water. The liquid reaction mixture was discharged from the reaction vessel, dehydrated by distillation and the monoisobutanolamine was separated from the di- and triisobutanolamines by further fractionation.

The isobutylene oxide consumed was found to be distributed in the reaction products as follows:

Obtained as monoisobutanolamine
in the liquid reaction mixture__ 87.3 gm. 50.7%
Obtained as monoisobutanolamine
in the $NH_3$ absorption water___ 46.5 gm. 27.3%
Obtained as di- and triisobutanol-
amines_____ 37.8 gm. 22.7%

It is seen that under the above described conditions, 27.3% of the consumed isobutylene oxide did not react to form monoisobutanolamine in the reaction vessel. This amount of isobutylene oxide evidently remained in the gas phase and reacted when said gas phase was expanded into water. These results indicate the desirability of operating under conditions which will permit the existence of only a liquid phase in the reaction vessel.

The molal ratio of isobutylene oxide:amonia: water in the reaction mixture was equal to 1:24.8:78. A total of 78% of the consumed isobutylene oxide was converted to monoisobutanolamine.

*Example III*

The reaction was effected in a continuous manner in an apparatus substantially as illustrated in the accompanying figure.

The aqueous ammonia feed tank was charged with a convenient amount of a 28% ammonia solution. The alkylene oxide feed tank was charged with isobutylene oxide. Both feed tanks were put under a nitrogen pressure of about 200 lbs./sq. in. (gauge). The isobutylene oxide and aqueous ammonia solution were fed into the reaction vessel in such quantities that the molal ratio of isobutylene oxide:ammonia:water therein was equal to about 1:43:105. The rate of flow of the reagents was regulated so as to maintain an average reaction time of about 53 minutes. The reaction vessel was maintained at a temperature of about 99° C. and a gauge pressure of about 70 lbs./sq. in.

After about 8 hours of continuous operation, the aqueous isobutanolamine solution was dehydrated by distillation and the monoisobutanolamine was separated from the di- and triisobutanolamines by further fractionation under subatmospheric pressure. A total of about 73.2% of the applied isobutylene oxide was consumed. The yield of monoisobutanolamine calculated on the isobutylene applied was 63.2%. The yield of monoisobutanolamine based on the reacted isobutylene oxide was 86.5%.

The pure monoalkylolamines, as well as the mixtures of alkylolamines predominating in monoalkylolamines, prepared by my method may be used for a wide variety of suitable purposes. They may be advantageously employed as absorbent agents for the removal of acidic gaseous components such as $H_2S$, $CO_2$, $NO_2$, $HCN$ and the like from gases, vapors and gaseous mixtures. The spent or partially monoalkylolamines containing acidic gases in solution may be readily regenerated. The monoalkylolamines may also be used to recover phenols from tar oils. The monoalkylolamines are particularly useful as extraction agents for use in the refining of mineral and vegetable oils. In general, in extraction processes such as in the purification and refining of natural organic products such as vegetable and animal oils, fats, waxes and the like such as cocoanut oil, cottonseed oil and fish oil, the use of monoalkylolamines or mixtures comprising substantially only monoalkylolamine is preferable over the use of the "di-" and "tri-" compounds due to the fact that the boiling point of the monoalkylolamines is in general lower. This renders the monoalkylolamines more readily recoverable at lower temperature of distillation and with less decomposition.

The monoalkylolamines may also be applied in the preparation of photographic films, wetting agents, rubber accelerators, hydrocarbon-soluble soaps, explosives and catalysts. The monoalkylolamines are in general useful as wetting agents, plasticizers with cellulose esters, agents for causing the deeper penetration of dyes and also for securing a deeper penetration of creosote in wood preserving. Monoalkylolamines may, in addition, be useful in the tanning of leather, in the preparation of artificial leather and in the sizing of cellulose materials. The monoalkylolamines may serve as dehydrating and emulsifying agents in a wide variety of processes. Many of the salts of the monoalkylolamines are valuable as detergents and sizing agents. The monoalkylolamine borates are of therapeutic value. The monoalkylolamine soaps are of particular value as fluxes, as ingredients for spray compositions for agricultural purposes and as auxiliary agents in the textile, leather, paper and cleaning industries.

While I have in the foregoing described in some detail the preferred embodiments of my invention and some variants thereof, it will be understood that this is only for the purpose of making the invention more clear and that the invention is not to be regarded as limited to the details of operation described, but may be variously employed within the scope of the claims hereinafter made.

I claim as my invention:

1. In a process for the production of essentially a monoalkylolamine which comprises reacting an alkylene oxide with an excess of ammonia and water at a temperature and pressure at which water in the reaction system is liquid, the improvement which comprises carrying out the reaction with the agents in the ratio of one mol of alkylene oxide to at least twenty mols of ammonia and to at least ten mols of water so as to equal an aqueous ammonia solution having a concentration of from about 18% to about 70% $NH_3$, to obtain a reaction product materially predominating in monoalkylolamine.

2. In a process for the production of essentially a monoalkylolamine which comprises reacting an alkylene oxide with an excess of ammonia and water at a temperature and pressure at which water in the reaction system is liquid, the improvement which comprises carrying out the reaction with the agents in the ratio of one mol of alkylene oxide to from twenty to fifty mols of ammonia and to from ten to two hundred mols of water to obtain a reaction product materially predominating in monoalkylolamine.

3. In a process for the production of essentially a monoalkylolamine which comprises reacting an alkylene oxide with an excess of ammonia and water at a temperature and pressure at which water in the reaction system is liquid, the improvement which comprises carrying out the reaction in the temperature range of from about 20° C. to about 150° C. with the agents in a ratio of one mol of alkylene oxide to from twenty to fifty mols of ammonia and to from ten to two hundred mols of water to obtain a reaction product materially predominating in monoalkylolamine.

4. In a process for the production of essentially a monoalkylolamine which comprises reacting an alkylene oxide with an excess of ammonia and water at a temperature and pressure at which water in the reaction system is liquid, the improvement which comprises carrying out the reaction in the temperature range of from about 20° C. to about 150° C. and at a pressure in excess of two atmospheres with the agents in a ratio of one mol of alkylene oxide to from twenty to fifty mols of ammonia and to from ten to two hundred mols of water to obtain a reaction product materially predominating in a monoalkylolamine.

5. In a process for the production of essentially a monoalkylolamine which comprises reacting an alkylene oxide with an excess of ammonia and water at a temperature and pressure at which water in the reaction system is liquid, the improvement which comprises carrying out the reaction at a temperature in the range of from 90° C. to 150° C. with the agents in the ratio of one mol of alkylene oxide to from twenty to fifty mols of ammonia and to from ten to two hundred mols of water to obtain a reaction product materially predominating in monoalkylolamine.

6. In a process for the production of essentially a monoalkylolamine which comprises reacting an alkylene oxide with an excess of an aqueous ammonia solution at a temperature and pressure at which water in the reaction system is liquid, the improvement which comprises carrying out the reaction with an aqueous ammonia solution having an ammonia concentration in the range of from 15 to 70%, the ratio of alkylene oxide to ammonia and water being in a molal ratio of 1:20–50:10–200, to obtain a reaction product materially predominating in monoalkylolamine.

7. In a process for the production of essentially a monoalkylolamine which comprises reacting an alkylene oxide with an excess of an aqueous ammonia solution at a temperature and pressure at which water in the reaction system is liquid, the improvement which comprises carrying out the reaction with an aqueous ammonia solution having an ammonia concentration in the range of from 18 to 30%, the ratio of alkylene oxide to ammonia and water being in a molal ratio of 1:25–45:30–200, to obtain a reaction product materially predominating in monoalkylolamine.

8. In a continuous process for the production of essentially a monoalkylolamine, which comprises reacting an alkylene oxide with an excess of ammonia and water at a temperature and pressure at which water in the reaction system is liquid, the steps which comprise carrying out the reaction while maintaining the alkylene oxide, ammonia and water in the reaction mixture in the molal ratio of 1:20–50:10–200, recovering the reaction product which materially predominates in monoalkylolamine from the aqueous ammonia solution and reutilizing the recovered ammonia.

9. In a process for the production of essentially a monoalkylolamine which comprises reacting an alkylene oxide with an excess of an aqueous ammonia solution at a temperature and pressure at which water in the reaction system is liquid, the improvement which comprises carrying out the reaction in the liquid phase at a temperature in the range of from about 20° C. to about 150° C. with the agents in the ratio of one mol of alkylene oxide to from twenty to fifty mols of ammonia and to from ten to two hundred mols of water, separating the reaction product which materially predominates in monoalkylolamine from the unreacted ammonia redissolving the ammonia in water and reutilizing the aqueous ammonia solution.

10. In a process for the production of essentially monoethanolamine which comprises reacting ethylene oxide with an excess of ammonia and water at a temperature and pressure at which water in the reaction system is liquid, the improvement which comprises carrying out the reaction with the ethylene oxide, ammonia and water in the molal ratio 1:20–50:10–200 to obtain a reaction product material predominating in monoethanolamine.

11. In a process for the production of essentially monopropanolamine which comprises reacting a propylene oxide with an excess of ammonia and water at a temperature and pressure at which water in the reaction system is liquid, the improvement which comprises carrying out the reaction with the propylene oxide, ammonia and water in the molal ratio 1:20–50:10–200 to obtain a reaction product material predominating in monopropanolamine.

12. In a process for the production of essentially monobutanolamine which comprises reacting a butylene oxide with an excess of ammonia and water at a temperature and pressure at which water in the reaction system is liquid, the improvement which comprises carrying out the reaction with the butylene oxide, ammonia and water in the molal ratio 1:20–50:10–200 to obtain a reaction product material predominating in monobutanolamine.

CARL T. KAUTTER.